United States Patent
You

(10) Patent No.: US 12,028,771 B2
(45) Date of Patent: Jul. 2, 2024

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Xin You, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 364 days.

(21) Appl. No.: 17/512,175

(22) Filed: Oct. 27, 2021

(65) Prior Publication Data
US 2022/0053403 A1 Feb. 17, 2022

Related U.S. Application Data

(63) Continuation of application No. PCT/CN2019/085330, filed on Apr. 30, 2019.

(51) Int. Cl.
*H04W 36/32* (2009.01)
*H04W 72/51* (2023.01)

(52) U.S. Cl.
CPC ........... *H04W 36/32* (2013.01); *H04W 72/51* (2023.01)

(58) Field of Classification Search
CPC .............................. H04W 36/32; H04W 72/51
See application file for complete search history.

(56) References Cited

U.S. PATENT DOCUMENTS

| 6,721,567 B1* | 4/2004 | Wang ..................... H04W 28/26 455/436 |
| 2004/0192341 A1* | 9/2004 | Wang ..................... H04W 28/26 455/456.1 |
| 2015/0319668 A1* | 11/2015 | Guo ........................ H04W 72/51 370/331 |
| 2016/0198375 A1 | 7/2016 | Sundberg et al. |
| 2020/0052782 A1* | 2/2020 | Wang .................. H04W 74/006 |
| 2021/0297921 A1* | 9/2021 | Pragada ............ H04W 36/0072 |

FOREIGN PATENT DOCUMENTS

| CN | 103874149 A | 6/2014 |
| CN | 105657769 A | 6/2016 |
| CN | 107371195 A | 11/2017 |
| WO | 2020220321 A1 | 11/2020 |

OTHER PUBLICATIONS

International Search Report (ISR) dated Jan. 8, 2020 for Application No. PCT/CN2019/085330.
Written Opinion of the International Searching Authority in International Application No. PCT/CN2019/085330, dated Jan. 8, 2020 with English translation provided by Google Translate.

* cited by examiner

*Primary Examiner* — Brenda H Pham
(74) *Attorney, Agent, or Firm* — Ladas & Parry, LLP

(57) ABSTRACT

Embodiments of the present application provide a wireless communication method, a terminal device and a network device. The network device configures resources located on a plurality of target cells on a preset path, so that the terminal device can realize, based on the resources on the plurality of target cells, seamless handover among the plurality of target cells on the preset path. The method includes: receiving, by a terminal device, first information, the first information including resource allocations on a plurality of target cells, and the plurality of target cells being located on a first path to be passed through by the terminal device.

18 Claims, 4 Drawing Sheets

WIRELESS COMMUNICATION METHOD, TERMINAL DEVICE AND NETWORK DEVICE

CROSS-REFERENCE TO RELATED APPLICATION

This application is a continuation of the International Application No. PCT/CN2019/085330, filed on Apr. 30, 2019, the disclosure of which is hereby incorporated by reference in its entirety.

TECHNICAL FIELD

Embodiments of the present application relate to the field of communication and, in particular, relate to a wireless communication method, a terminal device and a network device.

BACKGROUND

A 5-generation new radio (5-Generation New Radio, 5G N) system defines a deployment scenario of non-terrestrial networks (Non-terrestrial networks, NTN) including a satellite network. With a wide-area coverage capability of a satellite, the NTNs can realize the continuity of 5G NR services. At the same time, a higher requirement for a terminal device to switch among a plurality of cells is brought up by the NTN deployment scenario, and how to realize seamless handover of the terminal device among a plurality of target cells is an urgent problem to be solved.

SUMMARY

Embodiments of the present application provide a wireless communication method, a terminal device and a network device, the network device configures resources located on a plurality of target cells on a preset path, so that the terminal device can realize, based on the resources on a plurality of target cells, seamless handover among the plurality of target cells on the preset path.

In a first aspect, a wireless communication method is provided, the method including:
receiving, by a terminal device, first information, where the first information includes resource allocations on a plurality of target cells, and the plurality of target cells is located on a first path to be passed through by the terminal device.

In an implementation, the method is applied to an NTN.

In a second aspect, a wireless communication method is provided, the method including:
sending, by a network device, first information to a terminal device, where the first information includes resource allocations on a plurality of target cells, and the plurality of target cells are located on a first path to be passed through by the terminal device.

In an implementation, the method is applied to an NTN.

In a third aspect, a terminal device is provided, configured to execute the method in the above first aspect or each implementation thereof.

Specifically, the terminal device includes a function module for execute the method in the above first aspect or each implementation thereof.

In a fourth aspect, a network device is provided, configured to execute the method in the above second aspect or each implementation thereof.

Specifically, the network device includes a function module for execute the method in the above second aspect or each implementation thereof.

In a fifth aspect, a terminal device is provided, including a processor and a memory. The memory is configured to store a computer program, and the processor is configured to call and run a computer program stored in the memory to execute the method in the above first aspect or each implementation thereof.

In a sixth aspect, a network device is provided, including a processor and a memory. The memory is configured to store a computer program, and the processor is configured to call and run a computer program stored in the memory to execute the method in the above second aspect or each implementation thereof.

In a seventh aspect, an apparatus is provided, configured to implement the method in any one of the above first aspect to the second aspect or each implementation thereof.

Specifically, the apparatus includes: a processor, configured to call and run a computer program from a memory to cause a device installed with the apparatus to execute the method in any one of the above first aspect to the second aspect or each implementation thereof.

In an eighth aspect, a computer-readable storage medium is provided, configured to store a computer program, the computer program causing a computer to execute the method in any one of the above first aspect to the second aspect or each implementation thereof.

In a ninth aspect, a computer program conduct is provided, including computer program instructions, the computer program instructions causing a computer to execute the method in any one of the above first aspect to the second aspect or each implementation thereof.

In a tenth aspect, a computer program is provided, where the computer program, when running on the computer, causes a computer to execute the method in any one of the above first aspect to the second aspect or each implementation thereof.

Through the above technical solutions, the network device can configure resource allocations on a plurality of target cells located on the first path for the terminal device, therefore, the terminal device realizes, based on the resource allocations on a plurality of target cells, seamless handover among the plurality of target cells.

DETAILED DESCRIPTION OF EMBODIMENTS

The technical solutions in embodiments of the present application will be described below in conjunction with the drawings in the embodiments of the present application. Obviously, the described embodiments are a part of the embodiments of the present application, not all of the embodiments. For the embodiments in the present application, all other embodiments obtained by those of ordinary skill in the art without paying creative effort shall fall within the protection scope of the present application.

The embodiments of the present application can be applied to various communication systems, such as: a global system of mobile communication (Global System of Mobile communication, GSM) system, a code division multiple access (Code Division Multiple Access, CDMA) system, a wideband code division multiple access (Wideband Code Division Multiple Access, WCDMA) system, a general packet radio service (General Packet Radio Service GPRS), a long term evolution (Long Term Evolution, LTE) system, an advanced long term evolution (Advanced long term evolution, LTE-A, LTE-A) system, a new radio (NR New Radio, NR) system, a NR evolution system, a LTE-based access to unlicensed spectrum (LTE-based access to unlicensed spectrum, LTE-U) system, a NR-based access to unlicensed spectrum (NR-U NR-based access to unlicensed spectrum, NR-U) system, a universal mobile telecommunication system (Universal Mobile Telecommunication System, UMTS) system, a wireless local area network (Wireless Local Area Networks, WLAN), a wireless fidelity (Wireless Fidelity, WiFi), a next generation communication system or other communication systems, etc.

Generally speaking, a traditional communication system supports a limited number of connections and is easy to implement. However, with the development of communication technologies, a mobile communication system will not only support traditional communication, but will also support, for example, device to device (Device to Device, D2D) communication, machine to machine (Machine to Machine, M2M) communication, machine type communication (Machine Type Communication, MTC), and vehicle to vehicle (Vehicle to Vehicle, V2V) communication, etc. The embodiments of the present application can also be applied to these communication systems.

In an implementation, the communication system in the embodiments of the present application can be applied to a carrier aggregation (Carrier Aggregation, CA) scenario, can also be applied to a dual connectivity (Dual Connectivity, DC) scenario, and can further be applied to a standalone (Standalone, SA) deployment network scenario.

The embodiments of the present application do not limit an applied frequency spectrum. For example, the embodiments of the present application can be applied to a licensed spectrum or an unlicensed spectrum.

Figure 1:
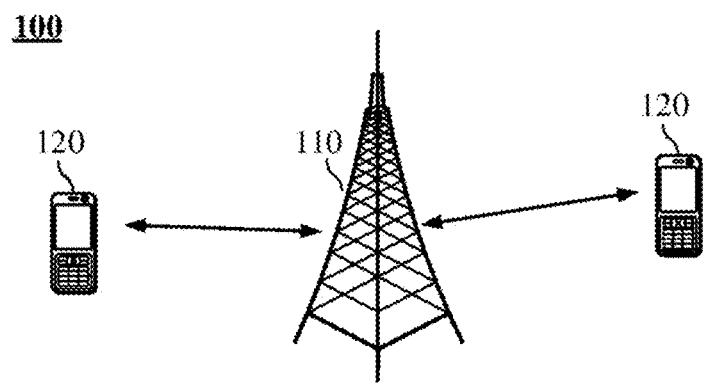
FIG. 1 is a schematic diagram of a communication system architecture provided by an embodiment of the present application.

Exemplarily, a communication system 100 applied in the embodiments of the present application is shown in FIG. 1.

The communication system 100 may include a network device 110, and the network device 110 may be a device in communication with a terminal device 120 (or called as a communication terminal, a terminal). The network device 110 can provide communication coverage for a specific geographic area, and can communicate with a terminal device located in the coverage area.

FIG. 1 exemplarily shows one network device and two terminal devices. In an implementation, the communication system 100 may include a plurality of network devices and other numbers of terminal devices can be included in a coverage of each network device, which is not limited in the embodiments of the present application.

In an implementation, the communication system 100 may also include other network entities, such as a network controller, a mobility management entity, which is not limited in the embodiments of the present application.

It should be understood that, in the network/system in the embodiments of the present application, the device with a communication function may be referred to as a communication device. Taking the communication system 100 shown in FIG. 1 as an example, the communication device may include the network device 110 and the terminal devices 120 with the communication function, and the network device 110 and the terminal devices 120 may be the specific devices described above, which will not be repeated here. The communication device may also include other devices in the communication system 100, for example, other network entities such as a network controller, a mobility management entity, etc., which are not limited in the embodiments of the present application.

It should be understood that the terms "system" and "network" are often used interchangeably herein. The term "and/or" herein is only an association relationship for describing associated objects, and means that there can be three types of relationships. For example, the expression "A and/or B" may indicate three cases: A exists alone, A and B exist at the same time, and B exists alone. In addition, the character "/" herein generally indicates that the associated objects before and after the character are in an "or" relationship.

The embodiments of the present application describe various embodiments in conjunction with the terminal device and network device, where the terminal device can be referred to as a user equipment (User Equipment, UE), an access terminal, a user unit, a user station, a mobile station, a mobile platform, a remote station, a remote terminal, a mobile device, a user terminal, a terminal, a wireless communication device, a user agent or a user apparatus. The terminal device can be a station (STATION, ST), a cellular phone, a cordless phone, a session initiation protocol (Session Initiation Protocol, SIP) phone, a wireless local loop (Wireless Local Loop, WLL) station, a personal digital assistant (Personal Digital Assistant, PDA) device, a handheld device with a wireless communication function, a computing device with a wireless communication function, or other processing devices connected to a wireless modem and having a wireless communication function, an in-vehicle device, a wearable device or a terminal device in a next generation communication system, such as a NR network or a terminal device in a future evolutional public land mobile network (Public Land Mobile Network, PLMN), etc.

By way of example but not limitation, in the embodiments of the present application, the terminal device may also be a wearable device. The wearable device can also be called as a wearable smart device, which is a collective name of wearable devices which are developed by intelligently designing an everyday wear using a wearable technology, such as glasses, gloves, a watch, clothing and a shoe. The wearable device is a portable device that is worn directly on a body or integrated into a cloth or accessories of a user. The wearable device is not only a hardware device, but also realizes a powerful function through software support, data interaction and cloud interaction. In a broad sense, wearable smart devices include, for example, smart watches or smart glasses or the like which have full functions and large sizes, and can realize complete or partial functions without relying on smart phones, as well as devices which simply focus on a certain application function and need to be used in conjunction with other devices such as smart phones, such as various smart jewelries and smart bracelets for monitoring physical signs.

The network device may be a device used to communicate with a mobile device. The network device may be an access point (Access Point, AP) in a WLAN, a base station (Base Transceiver Station, BTS) in GSM or CDMA, or a base station (NodeB, NB) in WCDMA, or an evolved base station (Evolutional Node B, eNB or eNodeB) in LTE, or a relay station or an access point, or in-vehicle device, a wearable device and a network device (gNB) in a NR network or a network device in a future evolutional PLMN network, etc.

In the embodiments of the present application, the network device provides service for a cell, and the terminal device communicates with the network device through a transmission resource (e.g., a frequency domain resource or a spectrum resource) used by the cell. The cell may be a cell corresponding to the network device (e.g., a base station), and the cell may belong to a macro base station or a base station corresponding to a small cell (Small cell). The small cell here can include: a metro cell (Metor cell), a microcell (Micro cell), a pico cell (Pico cell), a femto cell (Femto cell), etc. These small cells have the characteristics of small coverage and low transmission power, and are suitable for providing a high-speed data transmission service.

The 3rd generation partnership project (The 3rd Generation Partnership Project, 3GPP) started the research work of satellite-ground integration from release 14 (Release 14 (Rel 14). The role and advantages of a satellite in 5-Generation mobile communication technology (5-Generation, 5G) system are discusses, and as one of various access technologies of 5G, the satellite has obvious advantages in some industrial application scenarios requiring wide-area coverage. A satellite network can provide a low-cost coverage solution in weak areas covered by ground 5G, for machine to machine (Machine to Machine, M2M) or internet of things (Internet of Things, IoT) in 5G network, and provide omnipresent network services for passengers on high-speed mobile carriers, and provide broadcast/multicast information services for network edge network elements and terminals by virtue of superior broadcast/multicast capability of the satellite.

The 3GPP defines a deployment scenario of NTN including the satellite network, and NTN application scenarios in 5G network include 8 enhance mobile broadband (Enhance Mobile Broadband, eMBB) scenarios and 2 massive machine type of communication (massive machine type of communication, mMTC) scenarios. With the wide-area coverage capability of satellites, operators can provide 5G commercial services in areas with underdeveloped ground network infrastructure and realize 5G business continuity, especially playing a role in emergency communication, maritime communication, aviation communication and communication along railways.

System components that a satellite network architecture may include comprise:

NTN terminal: 3GPP user terminal (UE) and non-3GPP UE (satellite terminal);
service link (Service Link): a link between a UE and a satellite;
space platform (Space Platform): a satellite equipped with elbow or on-board processing capability;
inter-satellite links (Inter-Satellite Links, ISL): links between satellites with on-board processing capability
gateway (Gateway): a network element connecting a satellite and a ground core network;
a feed link.

It should be understood that at this stage, the main process of cell handover includes the following steps:

handover preparation: a source base station configures a UE to perform measurement report, and sends a handover request to a target base station based on a report result of UE. After the target base station agrees to the handover request, it will configure RRC messages carrying mobility control information (mobility Control Information) for the UE, which include random access channel (Random Access Channel, RACH) resources, cell radio network temporary identity (Cell Radio Network Temporary Identity, C-RNTI), target base station security algorithm and system messages of the target base station, etc.

Handover execution: the source base station forwards mobility control information (mobility Control Information) to the UE, and after receiving the handover command, the UE initiates a random access procedure to the target base station. At the same time, the source base station will send a sequence number status transfer (Sequence Number STATUS TRANSFER) to the target base station to inform the target base station of uplink packet data convergence protocol (Packet Data Convergence Protocol, PDCP) SN receiving status and downlink PDCP SN sending status.

Handover completion: after the UE successfully accesses the target base station (random access is successful), the target base station will send a path switch request (PATH SWITCH REQUEST) to request a mobility management entity (Mobility Management Entity, MME) to switch a downlink path. After the path handover is completed, the target base station will instruct the source base station to release a UE context and the handover is completed.

In the existing cell handover procedure, as long as the terminal device successfully accesses one target cell, the terminal device will consider the handover complete. Even for a conditional handover where multiple target cells can be configured, due to the uncertainty of the moving trajectory of the terminal device, the terminal device will delete resource allocation of other target cells, thus resulting in waste of resources.

This application proposes a handover process based on non-terrestrial networks, in particular, a plurality of target cells are pre-configured for physical random access channel (Physical Random Access Channel, PRACH) resources in the handover process, so that the terminal can perform the seamless handover on a pre-configured moving trajectory, thus avoiding redundant measurement report and avoiding additional resource waste at the interaction (X2 interface) between the source base station and the target base station.

The following describes in detail a handover process based on non-terrestrial networks designed in the present application aiming at the above technical problems.

Figure 2:
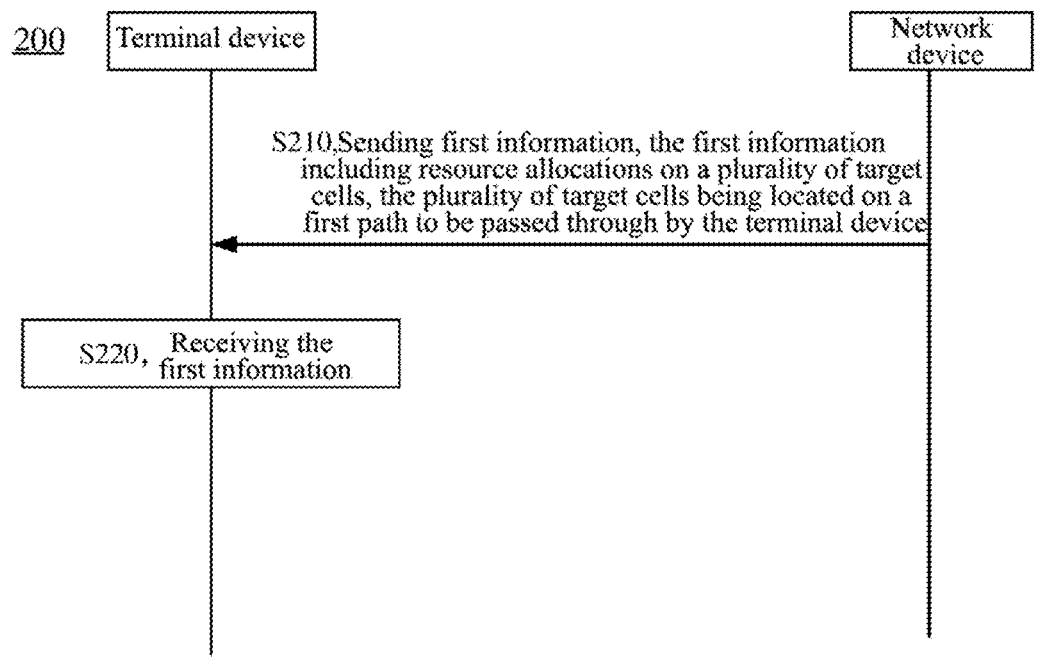
FIG. 2 is a schematic flow chart of a wireless communication method provided by an embodiment of the present application.

FIG. 2 is a schematic flow chart of a wireless communication method 200 according to an embodiment of the present application, as show in FIG. 2, the method 200 can include the following contents:

S210: a network device sends first information to a terminal device, the first information includes resource allocations on a plurality of target cells, and the plurality of target cells are located on a first path to be passed through by the terminal device;

S220: the terminal device receives the first information.

In an implementation, the method 200 is applied to an NTN.

In an implementation, the resource allocation on the plurality of target cells can be a PRACH resource for random access and/or a physical uplink shared channel (Physical Uplink Shared Channel, PUSCH) resource.

It should be noted that in the existing conditional handover, although a plurality of target cells are configured, these target cells have the same access level, that is, the terminal device can select to access one target cell in the configured plurality of target cells, and delete resource allocation of other target cells after accessed. However, in embodiments of the present application, since the plurality of target cells are located on the first path to be passed through by the terminal device, that is, these target cells have different priority levels, and on the first path, a target cell in a position where the terminal device is located has a higher access level, while a target cell far away from the position where the terminal device is located has a lower access level. In the process of the terminal device passing through the first path, the terminal device can access a part or all of the target cells in turn according to the resource allocation on the plurality of target cells, or, obtain synchronization with a part or all of the plurality of target cells. That is to say, the terminal device can realize seamless handover on the first path according to the resource allocation on the plurality of target cells, thus avoiding redundant measurement report and avoiding additional resource waste at an interaction between the source base station and the target base station.

In an implementation, the first path is preconfigured. For example, the first path can be an airplane fairway, a high-speed rail line, an expressway, etc., which is not limited in the present application.

It should be noted that the first path can also be called as a first moving trajectory.

In an implementation, at least one target cell in the plurality of target cells exists at a same position of the first path.

For example, there are target cell 1 and target cell 2 at position A of the first path, where the target cell 1 belongs to operator P and the target cell 2 belongs to operator Q, or, target cell 1 and target cell 2 belong to different base stations of the same operator.

It should be noted that the target cells at the same position of the first path can be understood as: on the first path, a certain position is taken as a center, all target cells within a certain range around the certain position can be considered to be in the same position, for example, position A is taken as the center, all target cells within 100 m around position A can be considered to be in the same position. Of course, the range can be determined according to a length of the first path, which is not limited in the present application. In addition, the target cell at the same position on the first path can also be understood as: multiple target cells whose coverages including the same position, for example, the coverages of multiple target cells include position A on the first path, which means that these target cells are at the same position on the first path.

In an implementation, reservation time of resource allocations on different target cells in the at least one target cell is the same or different.

Figure 3:
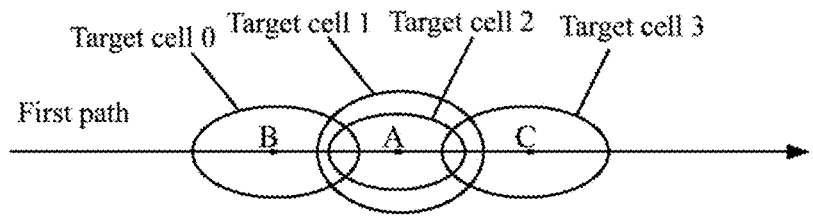
FIG. 3 is a schematic diagram of a resource allocation reservation time on a target cell provided by an embodiment of the present application.

For example, as shown in FIG. 3, there are target cell 1 and target cell 2 at position A of the first path, where the target cell 1 belongs to operator P and the target cell 2 belongs to operator Q, and the reservation time of the resource allocation on target cell 1 is greater than that on target cell 2.

In an implementation, the reservation time of resource allocations on target cells at adjacent two positions of the first path is different.

In an implementation, in embodiments of the present application, the reservation time of resource resources on the plurality of target cells is determined according to at least one of location information of the terminal device, a movement speed of the terminal device and a coverage of each target cell in the plurality of target cells.

Correspondingly, the network device determines the reservation time of resource allocations on the plurality of target cells according to at least one of the location information of the terminal device, the movement speed of the terminal device and the coverage of each target cell in the plurality of target cells.

In an implementation, in the embodiments of the present application, the reservation time of resource allocation on each target cell in the plurality of target cells is determined according to a sequence in which the terminal device arrives at the plurality of target cells.

Correspondingly, the network device determines the reservation time of resource allocation on each target cell in the plurality of target cells according to the sequence in which the terminal device arrives at the plurality of target cells.

Specifically, a reservation time start position of resource allocation on a first target cell is the same as a reservation time start position of resource allocation on a second target cell, and the reservation time of the resource allocation on the second target cell is greater than the reservation time of the resource allocation on the first target cell, where the first target cell and the second target cell are located at two adjacent positions on the first path, and a position on the first path at which the second target cell is located is behind the first target cell, the first target cell and the second target cell belong to the plurality of target cells.

It should be noted that the first target cell and the second target cell are any two target cells in adjacent positions in the plurality of target cells.

Figure 4:
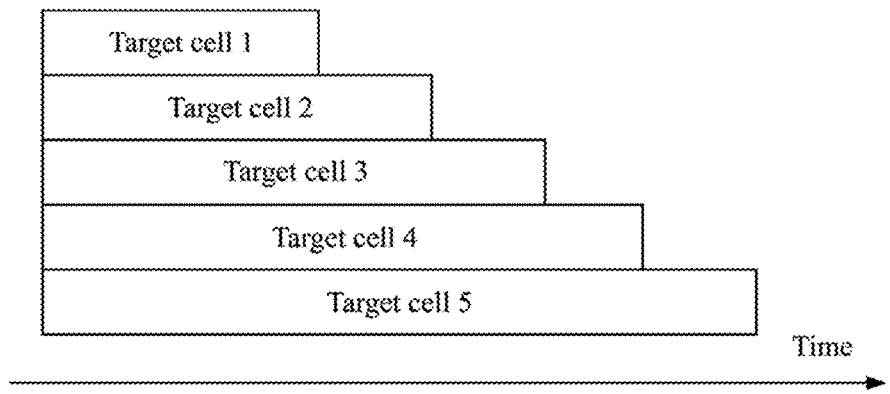
FIG. 4 is a schematic diagram of another resource allocation reservation time on a target cell provided by an embodiment of the present application.

For example, as shown in FIG. 4, in the process of moving of the terminal device based on the first path, the terminal device passes through target cell 1 to target cell 5 in turn, the reservation time of the resource allocation on each target cell is determined according to the sequence in which the terminal device arrives at the 5 target cells. For the target cell 1, as the terminal device will soon move into a coverage of the target cell 1, the resource allocation on the target cell 1 can reserve a relatively less time for the terminal device; on the contrary, the target cell 5 is far away from the terminal device. Therefore, resource allocation on target cell 5 needs to reserve a longer time for the terminal device.

In an implementation, in the embodiments of the present application, a reservation time start position of resource allocation on each target cell in the plurality of target cells is determined according to a sequence in which the terminal device arrives at the plurality of target cells.

Correspondingly, the network device determines, according to the sequence in which the terminal device arrives at the plurality of target cells, the reservation time start position of the resource allocation on each target cell in the plurality of target cells.

Specifically, a reservation time of resource allocation on a first target cell is the same as or different from a reservation time of resource allocation on a second target cell, and a reservation time start position of resource allocation on the first target cell is before a reservation time start position of resource allocation on the second target cell, where the first target cell and the second target cell are located at two adjacent positions on the first path, and a position on the first path at which the second target cell is located is behind the first target cell, the first target cell and the second target cell belong to the plurality of target cells.

It should be noted that the first target cell and the second target cell are any two target cells in adjacent positions in the plurality of target cells.

In an implementation, whether the reservation time of the resource allocation on the first target cell is the same as the reservation time of the resource allocation on the second target cell can be determined based on coverages of the first target cell and the second target cell, for example, if the coverages of the first target cell and the second target cell are same, the reservation time of the resource allocation on the first target cell is the same as that on the second target cell; if the coverages of the first target cell and the second target cell are different, the reservation time of the resource allocation on the first target cell is different from that on the second target cell.

In an implementation, there is an overlapping area between the reservation time of the resource allocation on the first target cell and the reservation time of the resource allocation on the second target cell.

It should be noted that there is the overlapping area between the reservation time of the resource allocation on the first target cell and the reservation time of the resource allocation on the second target cell, which is due to there is an overlapping area between the coverage of the first target cell and the coverage of the second target cell.

Figure 5:
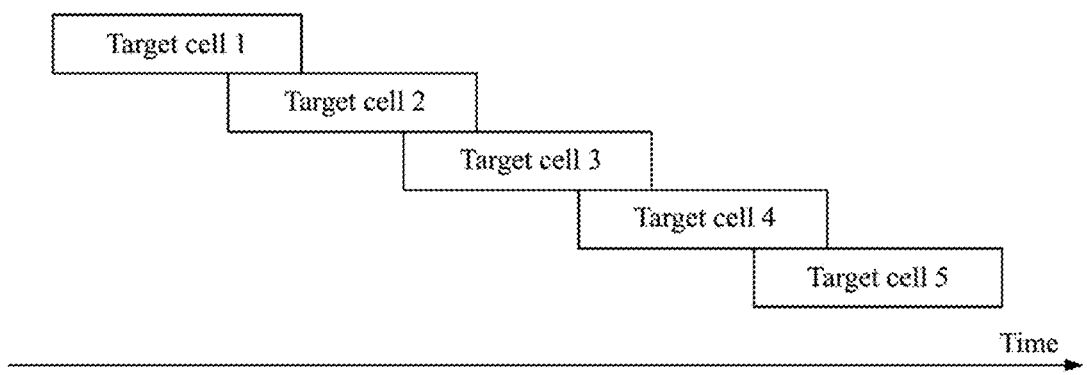
FIG. 5 is a schematic diagram of another resource allocation reservation time on a target cell provided by an embodiment of the present application.

For example, as shown in FIG. 5, in the process of moving of the terminal device based on the first path, the terminal device passes through the target cell 1 to the target cell 5 in turn, the reservation time start position of the resource allocation on each target cell is determined according to the sequence in which the terminal device arrives at the 5 target cells. Since the movement trajectory and movement speed of the terminal device are predetermined, the time when the terminal moves to a certain target cell can also be predicted. As shown in FIG. 5, the reservation time of resource allocations on all of the 5 target cells is the same. There exists an overlapping area between the reservation time of the resource allocations on the target cells of adjacent positions, specifically, there exists an overlapping area between reservation time of resource allocation on the target cell 1 and reservation time of resource allocation on the target cell 2, there exists an overlapping area between the reservation time of resource allocation on the target cell 2 and the reservation time of resource allocation on the target cell 3, there exists an overlapping area between the reservation time of resource allocation on the target cell 3 and the reservation time of resource allocation on the target cell 4, and there exists an overlapping area between the reservation time of resource allocation on the target cell 4 and the reservation time of resource allocation on the target cell 5.

In an implementation, a reservation time end position of resource allocation on the first target cell is the reservation time start position of resource allocation on the second target cell.

That is, the reservation time of resource allocation on the first target cell and the reservation time of resource allocation on the second target cell are continuous, thus completely avoiding the waste of resources.

Figure 6:
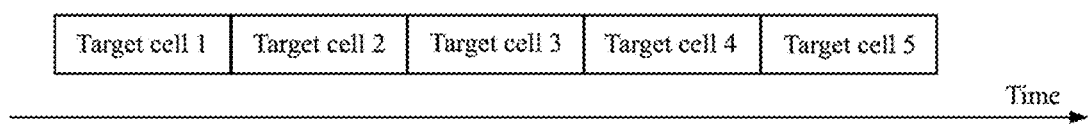
FIG. 6 is a schematic diagram of still another resource allocation reservation time on a target cell provided by an embodiment of the present application.

For example, as shown in FIG. 6, in the process of moving of the terminal device based on the first path, the terminal device passes through the target cell 1 to the target cell 5 in turn, the reservation time start position of the resource allocation on each target cell is determined according to the sequence in which the terminal device arrives at the 5 target cells. Since the movement trajectory and movement speed of the terminal device are predetermined, the time when the terminal moves to a certain target cell can also be predicted. As shown in FIG. 6, the reservation time of resource allocations on all of the 5 target cells is the same, and it is continuous between the reservation time of the resource allocations on the target cells of adjacent positions. Specifically, a reservation time end position of resource allocation on the target cell 1 is a reservation time start position of resource allocation on the target cell 2, a reservation time end position of resource allocation on the target cell 2 is a reservation time start position of resource allocation on the target cell 3, a reservation time end position of resource allocation on the target cell 3 is a reservation time start position of resource allocation on the target cell 4, and a reservation time end position of resource allocation on the target cell 4 is a reservation time start position of resource allocation on the target cell 5.

It should be noted that, as show in FIG. 5 and FIG. 6, the reservation time of resource allocations on all of the 5 target cells is the same, of course, the reservation time of resource allocations on different target cells in the 5 target cells may also be different. For example, the reservation time of resource allocation on target cell 1 is the same as the reservation time of resource allocation on target cell 2, and the reservation time of resource allocation on target cell 2 is different from the reservation time of resource allocation on target cell 3. For another example, the reservation time of resource allocation on target cell 1 is different from the reservation time of resource allocation on target cell 2, and the reservation time of resource allocation on target cell 2 is different from the reservation time of resource allocation on target cell 3.

In an implementation, the first information is a handover command. That is, the resource allocations on the plurality of target cells can be carried in one handover command, or can be sent separately one by one.

In an implementation, the handover command may also include information required for accessing the target cell, for example, the handover command at least includes a target cell identity, a new cell radio network temporary identity (Cell Radio Network Temporary Identity, C-RNTI), and the target gNB security algorithm identifiers for the selected security algorithms. The handover command also includes a set of dedicated random access channel (Random Access Channel, RACH) resources, an association relationship between the RACH resource and a synchronization signal block (Synchronization Signal Block, SSB), an association relationship between the RACH resource and UE-specific channel state information reference signal (Channel State Information Reference Signal, CSI-RS) configuration, a common RACH resource, a system information block (System Information Block, SIB) of the target cell and preconfigured timing advance (Timing Advance, TA).

Specifically, before executing the handover command, the terminal device can determine whether the resource allocations on the plurality of target cells are available.

In an implementation, in the embodiments of the present application, in the process of the terminal device passing through the first path, the terminal device may access some or all of the target cells according to the resource allocations on the target cells, or obtain synchronization with some or all of the target cells.

In an implementation, in embodiments of the present application, in the process that the terminal device passes through the first path, the terminal device accesses, according to resource allocation on the plurality of target cells, part or all of the plurality of target cells or obtains synchronization with part or all of the plurality of target cells.

Specifically, the terminal device determines whether the resource allocations on the plurality of target cells are available; and when the resource allocation is available, accesses a target cell at which the resource allocation is located, or obtains synchronization with the target cell at which the resource allocation is located.

In an implementation, the terminal device can determine whether the resource allocations on the plurality of target cells are available according to the following ways.

Way 1,
the terminal device determines whether a measurement value of a third target cell is greater than a first threshold, the third target cell belongs to the plurality of target cells; if the measurement value of the third target cell is greater than the first threshold, the terminal device determines that the resource allocation on the third target cell is available; if the measurement value of the third target cell is less than or equal to the first threshold, the terminal device determines that the resource allocation on the third target cell is unavailable.

It should be noted that the third target cell is any one of the plurality of target cells.

In an implementation, each target cell in the plurality of target cells corresponds to one first threshold, or, the plurality of target cells correspond to one first threshold.

In an implementation, the measurement value includes one of the followings:
a reference signal receiving power (Reference Signal Receiving Power, RSRP), a reference signal receiving quality (Reference Signal Receiving Quality, RSRQ), a signal to interference plus noise ratio (Signal to Interference plus Noise Ratio, SINR).

In an implementation, the first threshold is preconfigured or configured by a network device.

Way 2,
The first information is also used to configure a plurality of target time, the target time corresponds to the target cells one by one,
in a first target time, the terminal device determines that resource allocation on a target cell corresponding to the first target time is available, and determines that resource allocations on other target cells in the plurality of target cells except the target cell corresponding to the first target time are unavailable.

In an implementation, the target time is absolute time or relative time, or the target time is a period of time.

Way 3,
the first information is further used to configure a plurality of target positions, the target positions correspond to the target cells one by one,
at a first target position, the terminal device determines that resource allocation on a target cell corresponding to the first target position is available, and determines that resource allocations on other target cells in the plurality of target cells except the target cell corresponding to the first target position are unavailable.

In an implementation, the target position is coordinate and/or longitude and latitude.

It should be noted that the above three ways to determine whether the resource allocations on the plurality of target cells are available can be combined.

For example, the way 1 and the way 2 are combined. First, the terminal device determines based on the way 2 that the resource allocation on target cell 1 is available, and then determines based on the way 1 that the resource allocation on target cell 1 is available, and the resource allocation on the target cell 1 is finally determined to be available.

For another example, the way 1 and the way 2 are combined. First, the terminal device based on the way 1 determines that the resource allocation on target cell 1 is available, and then determines based on the way 2 that the resource allocation on target cell 1 is available, and the resource allocation on the target cell 1 is finally determined to be available.

For another example, the way 1 and the way 3 are combined. First, the terminal device determines based on the way 3 that the resource allocation on target cell 1 is available, and then determines based on the way 1 that the resource allocation on target cell 1 is available, and the resource allocation on the target cell 1 is finally determined to be available.

For another example, the way 1 and the way 3 are combined. First, the terminal device determines based on the way 1 that the resource allocation on target cell 1 is available, and then determines based on the way 3 that the resource allocation on target cell 1 is available, and the resource allocation on the target cell 1 is finally determined to be available.

For another example, the way 2 and the way 3 are combined. First, the terminal device determines based on the way 2 that the resource allocation on target cell 1 is available, and then determines based on the way 3 that the resource allocation on target cell 1 is available, and the resource allocation on the target cell 1 is finally determined to be available.

For another example, the way 2 and the way 3 are combined. First, the terminal device determines based on the way 3 that the resource allocation on target cell 1 is available, and then determines based on the way 2 that the resource allocation on target cell 1 is available, and the resource allocation on the target cell 1 is finally determined to be available.

For another example, the way 1, the way 2 and the way 3 are combined. First, the terminal device determines based on the way 2/the way 3 that the resource allocation on target cell 1 is available, and then determines based on the way 1 that the resource allocation on target cell 1 is available, and the resource allocation on the target cell 1 is finally determined to be available.

For another example, the way 1, the way 2 and the way 3 are combined. First, the terminal device determines based on the way 1 that the resource allocation on target cell 1 is available, and then determines based on 1 the way 2/the way 3 that the resource allocation on target cell 1 is available, and the resource allocation on the target cell 1 is finally determined to be available.

Therefore, in the embodiments of the present application, since the plurality of target cells are located on the first path to be passed through by the terminal device, that is, these target cells have different priority levels, on the first path, a target cell in a position where the terminal device is located has a higher access level, while a target cell far away from the position where the terminal device is located has a lower access level. In the process of the terminal device passing through the first path, the terminal device can access a part or all of the target cells in turn according to the resource allocations on the plurality of target cells, or obtain synchronization with a part or all of the plurality of target cells. That is to say, the terminal device can realize seamless handover on the first path according to the resource allocations on the plurality of target cells, thus avoiding redundant measurement report and avoiding additional resource waste at an interaction between the source base station and the target base station.

Figure 7:
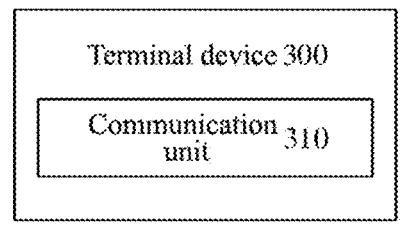
FIG. 7 is a schematic block diagram of a terminal device provided by an embodiment of the present application.

FIG. 7 is a schematic block diagram of a terminal device 300 according to an embodiment of the present application. As show in FIG. 7, the terminal device 300 includes:

a communication unit 310, configured to receive first information, where the first information includes resource allocations on a plurality of target cells, and the plurality of target cells are located on a first path to be passed through by the terminal device.

In an implementation, at least one target cell in the plurality of target cells exists at a same position of the first path.

In an implementation, reservation time of resource allocations on different target cells in the at least one target cell is the same or different.

In an implementation, reservation time of resource allocations on target cells at adjacent two positions of the first path is different.

In an implementation, the reservation time of resource allocations on the plurality of target cells is determined according to at least one of location information of the terminal device, a movement speed of the terminal device and a coverage of each target cell in the plurality of target cells.

In an implementation, a reservation time of resource allocation on each target cell in the plurality of target cells is determined according to a sequence in which the terminal device arrives at the plurality of target cells.

In an implementation, a reservation time start position of resource allocation on a first target cell is the same as a reservation time start position of resource allocation on a second target cell, and the reservation time of the resource allocation on the second target cell is greater than the reservation time of the resource allocation on the first target cell, where the first target cell and the second target cell are located at two adjacent positions on the first path, and a position on the first path at which the second target cell is located is behind the first target cell, the first target cell and the second target cell belong to the plurality of target cells.

In an implementation, a reservation time start position of resource allocation on each target cell in the plurality of target cells is determined according to a sequence in which the terminal device arrives at the plurality of target cells.

In an implementation, a reservation time of resource allocation on a first target cell is the same as or different from a reservation time of resource allocation on a second target cell, and a reservation time start position of resource allocation on the first target cell is before a reservation time start position of resource allocation on the second target cell, where the first target cell and the second target cell are located at two adjacent positions on the first path, and a position on the first path at which the second target cell is located is behind the first target cell, the first target cell and the second target cell belong to the plurality of target cells.

In an implementation, there is an overlapping area between the reservation time of the resource allocation on the first target cell and the reservation time of the resource allocation on the second target cell.

In an implementation, a reservation time end position of resource allocation on the first target cell is the reservation time start position of resource allocation on the second target cell.

In an implementation, the first information is a handover command.

In an implementation, the terminal device 300 further includes:

a processing unit, configured to access a part or all of the plurality of target cells or obtain synchronization with a part or all of the plurality of target cells according to resource allocations on the plurality of target cells, in the process of the terminal device passing through the first path.

In an implementation, the processing unit is specifically configured to:
determine whether the resource allocations on the plurality of target cells are available;
access a target cell at which the resource allocation is located or obtain synchronization with the target cell at which the resource allocation is located when the resource allocation is available.

In an implementation, the processing unit is specifically configured to:
determine whether a measurement value of a third target cell is greater than a first threshold, where the third target cell belongs to the plurality of target cells;
determine the resource allocation on the third target cell is available if the measurement value of the third target cell is greater than the first threshold;
determine the resource allocation on the third target cell is unavailable if the measurement value of the third target cell is less than or equal to the first threshold.

In an implementation, each target cell in the plurality of target cells corresponds to one first threshold, or, the plurality of target cells correspond to one first threshold.

In an implementation, the measurement value includes one of the followings:
an RSRP, an RSRQ, an SINR.

In an implementation, the first threshold is preconfigured or configured by a network device.

In an implementation, the first information is also used to configure a plurality of target time, the target time corresponds to the target cells one by one,
the processing unit is specifically configured to:
in a first target time, determine that resource allocation on a target cell corresponding to the first target time is available, and determine resource allocations on other target cells in the plurality of target cells except the target cell corresponding to the first target time are unavailable.

In an implementation, the target time is absolute time or relative time, or the target time is a period of time.

In an implementation, the first information is further used to configure a plurality of target positions, the target positions correspond to the target cells one by one,
the processing unit is specifically configured to:
at a first target position, determine that resource allocation on a target cell corresponding to the first target position is available and determine resource allocations on other target cells in the plurality of target cells except the target cell corresponding to the first target position are unavailable.

In an implementation, the target position is coordinate and/or longitude and latitude.

In an implementation, the first path is preconfigured.

In an implementation, the terminal device 300 is applied to an NTN.

It should be understood that the terminal device 300 according to an embodiment of the present application can correspond to the terminal device in the method embodiment of the present application, and the above-mentioned and other operations and/or functions of each unit in the terminal device 300 are respectively used for realizing the corresponding flow of the terminal device in the method 200 shown in FIG. 2, which will not be repeated here for brevity.

Figure 8:
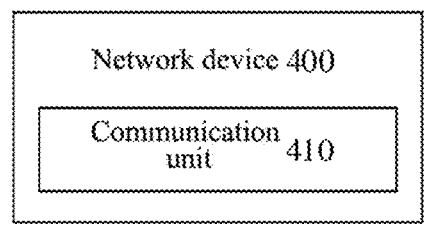
FIG. 8 is a schematic block diagram of a network device provided by an embodiment of the present application.

FIG. 8 is a schematic block diagram of a network device 400 according to an embodiment of the present application. As show in FIG. 8, the network device 400 includes:
- a communication unit 410, configured to send first information to a terminal device, where the first information includes resource allocations on a plurality of target cells, and the plurality of target cells are located on a first path to be passed through by the terminal device.

In an implementation, at least one target cell in the plurality of target cells exists at a same position of the first path.

In an implementation, reservation time of resource allocations on different target cells in the at least one target cell is the same or different.

In an implementation, reservation time of resource allocations on target cells at adjacent two positions of the first path is different.

In an implementation, the network device 400 further includes:
- a processing unit, configured to determine, according to at least one of location information of the terminal device, a movement speed of the terminal device and a coverage of each target cell in the plurality of target cells, reservation time of resource allocations on the plurality of target cells.

In an implementation, the processing unit is further configured to determine, according to a sequence in which the terminal device arrives at the plurality of target cell, a reservation time of resource allocation on each target cell in the plurality of target cells.

In an implementation, a reservation time start position of resource allocation on a first target cell is the same as a reservation time start position of resource allocation on a second target cell, and the reservation time of the resource allocation on the second target cell is greater than the reservation time of the resource allocation on the first target cell, where the first target cell and the second target cell are located at two adjacent positions on the first path, and a position on the first path at which the second target cell is located is behind the first target cell, the first target cell and the second target cell belong to the plurality of target cells.

In an implementation, the processing unit is further configured to determine, according to a sequence in which the terminal device arrives at the plurality of target cells, a reservation time start position of resource allocation on each target cell in the plurality of target cells.

In an implementation, a reservation time of resource allocation on a first target cell is the same as or different from a reservation time of resource allocation on a second target cell, and a reservation time start position of resource allocation on the first target cell is before a reservation time start position of resource allocation on the second target cell, where the first target cell and the second target cell are located at two adjacent positions on the first path, and a position on the first path at which the second target cell is located is behind the first target cell, the first target cell and the second target cell belong to the plurality of target cells.

In an implementation, there is an overlapping area between the reservation time of the resource allocation on the first target cell and the reservation time of the resource allocation on the second target cell.

In an implementation, a reservation time end position of resource allocation on the first target cell is the reservation time start position of resource allocation on the second target cell.

In an implementation, the first information is a handover command.

In an implementation, the first information is also used to configure one first threshold for each target cell in the plurality of target cells, or, one first threshold for the plurality of target cells, where the first threshold is used for the terminal device to determine the resource allocations on the plurality of target cells are available.

In an implementation, the first threshold includes one of the followings:
an RSRP, an RSRQ, an SINR.

In an implementation, the first information is also configured to a plurality of target times, the target times correspond to the target cells one by one, where the plurality of target times are used for the terminal device to determine whether the resource allocations on the plurality of target cells are available.

In an implementation, the target time is absolute time or relative time, or the target time is a period of time.

In an implementation, the first information is further used to configure a plurality of target positions, the target positions correspond to the target cells one by one, where the plurality of target positions are used for the terminal device to determine whether the resource allocations on the plurality of target cells are available.

In an implementation, the target position is coordinate and/or longitude and latitude.

In an implementation, the network device is applied to an NTN.

It should be understood that the network device 400 according to an embodiment of the present application can correspond to the network device in the method embodiment of the present application, and the above-mentioned and other operations and/or functions of each unit in the network device 400 are respectively used for realizing the corresponding flow of the network device in the method 200 shown in FIG. 2, which will not be repeated here for brevity.

Figure 9:
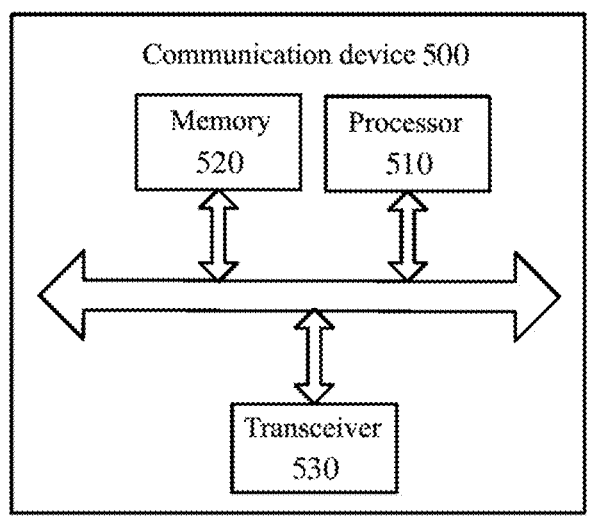
FIG. 9 is a schematic block diagram of a communication device provided by an embodiment of the present application.

FIG. 9 is a schematic structural diagram of a communication device 500 provided by an embodiment of the present application. The communication device 500 shown in FIG. 9 includes a processor 510, and the processor 510 can call and run a computer program from a memory to implement the methods in the embodiments of the present application.

In an implementation, as shown in FIG. 9, the communication device 500 can further include a memory 520. The processor 510 can call and run a computer program from the memory 520 to implement the methods in the embodiments of the present application.

The memory 520 may be a separate device independent of the processor 510, or may be integrated into the processor 510.

In an implementation, as shown in FIG. 9, the communication device 500 can further include a transceiver 530, and the processor 510 can control the transceiver 530 to communicate with other devices. Specifically, the transceiver may send information or data to other devices, or receive information or data sent by other devices.

The transceiver 530 may include a transmitter and a receiver. The transceiver 530 may further include an antenna, and the number of the antennas may be one or more.

In an implementation, the communication device 500 may specifically be a network device of embodiments of the present application, and the communication device 500 may implement corresponding processes implemented by the network device in respective methods of the embodiments of the application. For brevity, details are not repeated here.

In an implementation, the communication device 500 may specifically be a mobile terminal/terminal device according to embodiments of the present application, and the communication device 500 may implement corresponding processes implemented by the mobile terminal/terminal device in respective methods of the embodiments of the present application. For brevity, details are not repeated here.

Figure 10:
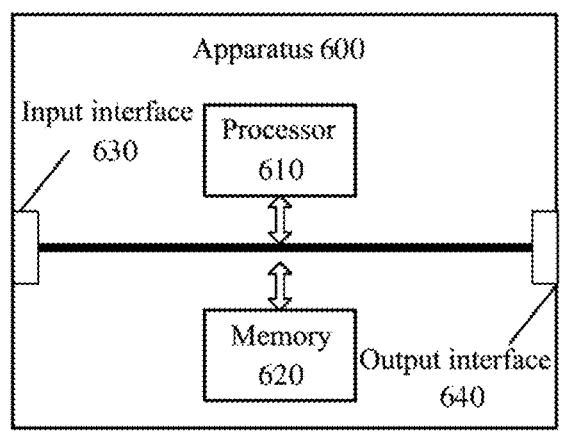
FIG. 10 is a schematic block diagram of an apparatus provided by an embodiment of the present application.

FIG. 10 is a schematic structural diagram of an apparatus of an embodiment of the present application. The apparatus 600 shown in FIG. 10 includes a processor 610, and the processor 610 can call and run a computer program from a memory to implement the methods in the embodiments of the present application.

In an implementation, as shown in FIG. 10, the apparatus 600 can further include a memory 620. The processor 610 can call and run a computer program from the memory 620 to implement the methods in the embodiments of the present application.

The memory 620 may be a separate device independent of the processor 610, or may be integrated into the processor 610.

In an implementation, the apparatus 600 can further include an input interface 630. The processor 610 can control the input interface 630 to communicate with other devices or chips, and specifically to acquire information or data sent by other devices or chips.

In an implementation, the apparatus 600 can further include an output interface 640. The processor 610 can control the output interface 640 to communicate with other devices or chips, and specifically to output information or data to other devices or chips.

In an implementation, the apparatus can be applied to the network device in the embodiments of the present application, and the apparatus can implement corresponding processes implemented by the network device in respective methods of the embodiments of the present application. For brevity, details are not repeated here.

In an implementation, the apparatus can be applied to the mobile terminal/terminal device in the embodiments of the present application, and the apparatus can implement corresponding processes implemented by the mobile terminal/terminal device in respective methods of the embodiments of the present application. For brevity, details are not repeated here.

In an implementation, the apparatus mentioned in the embodiments of the present application may also be a chip, such as a system-level chip, a system chip, a chip system, a system-on-chip, or the like.

Figure 11:
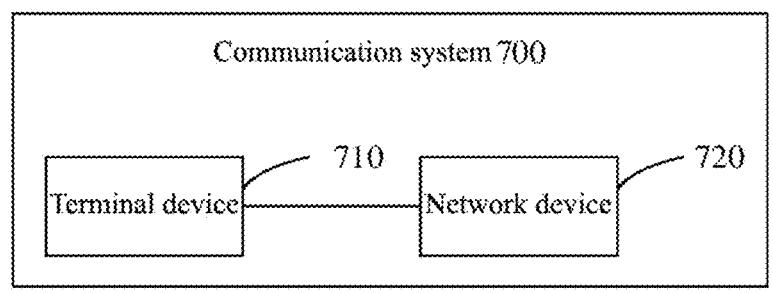
FIG. 11 is a schematic block diagram of a communication system provided by an embodiment of the present application.

FIG. 11 is a schematic block diagram of a communication system 700 provided by an embodiment of the present application. As shown in FIG. 11, the communication system 700 includes a terminal device 710 and a network device 720.

The terminal device 710 can be configured to implement corresponding functions implemented by the terminal device in the foregoing methods, and the network device 720 can be configured to implement corresponding functions implemented by the network device in the foregoing methods. For brevity, details are not repeated here.

It should be understood that the processor of the embodiments of the present application may be an integrated circuit chip with signal processing capabilities. In the implementation process, the steps of the foregoing method embodiments can be completed by an integrated logic circuit in hardware of the processor or by instructions in the form of software. The above-mentioned processor may be a general-purpose processor, a digital signal processor (Digital Signal Processor, DSP), an application specific integrated circuit (Application Specific Integrated Circuit, ASIC), a field programmable gate array (Field Programmable Gate Array, FPGA) or other programming logic devices, discrete gates or transistor logic devices, discrete hardware components, which can implement or perform various methods, steps, and logical block diagrams disclosed in the embodiments of the present application. The general-purpose processor may be a microprocessor, or the processor may also be any conventional processor or the like. The steps of the methods disclosed in the embodiments of the present application can be directly embodied as being executed and completed by a hardware decoding processor, or being executed and completed by a combination of hardware and software modules in a decoding processor. The software modules can be located in a mature storage medium in the art such as a random access memory, a flash memory, a read-only memory, a programmable read-only memory or an electrically erasable programmable memory, a register, etc. The storage medium is located in a memory, and the processor reads information in the memory and completes the steps of the above methods in combination with hardware thereof.

It can be understood that the memory in the embodiments of the present application may be a volatile memory or a non-volatile memory, or may include both volatile and non-volatile memories. The non-volatile memory may be a read-only memory (Read-Only Memory, ROM), a programmable read-only memory (Programmable ROM, PROM), an erasable programmable read-only memory (Erasable PROM, EPROM), and an electrically erasable programmable read-only memory (Electrically EPROM, EEPROM) or a flash memory. The volatile memory may be a random access memory (Random Access Memory, RAM), which is used as an external cache. By way of exemplary but not restrictive description, many forms of RAMS are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM)) and a direct rambus random access memory (Direct Rambus RAM, DR RAM). It should be noted that the memories of the systems and methods described herein are intended to include, but are not limited to, these and any other suitable types of memories.

It should be understood that the foregoing memories are exemplary but not restrictive. For example, the memory in the embodiments of the present application may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synch link dynamic random access memory (synch link DRAM, SLDRAM) and a direct memory bus random access memory (Direct Rambus RAM, DR RAM), etc. That is to say, the memories in the embodiments of the present application are intended to include, but not limited to, these and any other suitable types of memories.

An embodiment of the present application also provides a computer-readable storage medium for storing a computer program.

In an implementation, the computer-readable storage medium can be applied to the network device in the embodiments of the present application, and the computer program causes a computer to execute corresponding processes implemented by the network device in respective methods of the embodiments of the present application. For brevity, details are not repeated here.

In an implementation, the computer-readable storage medium can be applied to the mobile terminal/terminal device in the embodiments of the present application, and the computer program causes the computer to execute corresponding processes implemented by the mobile terminal/terminal in respective methods of the embodiments of the present application. For brevity, details are not repeated here.

An embodiment of the present application also provides a computer program product, including computer program instructions.

In an implementation, the computer program product can be applied to the network device in the embodiments of the present application, and the computer program instructions cause a computer to execute corresponding processes implemented by the network device in respective methods of the embodiments of the present application. For brevity, details are not repeated here.

In an implementation, the computer program product can be applied to the mobile terminal/terminal device in the embodiments of the present application, and the computer program instructions cause the computer to execute corresponding processes implemented by the mobile terminal/terminal device in respective methods of the embodiments of the present application. For brevity, details are not repeated here.

An embodiment of the present application also provides a computer program.

In an implementation, the computer program can be applied to the network device in the embodiments of the present application. When the computer program runs on a computer, the computer is caused to execute corresponding processes implemented by the network device in respective methods of the embodiments of the present application. For brevity, details are not repeated here.

In an implementation, the computer program can be applied to the mobile terminal/terminal device in the embodiments of the present application. When the computer program runs on the computer, the computer is caused to execute corresponding processes implemented by the mobile terminal/terminal device in respective methods of the embodiments of the present application. For brevity, details are not repeated here.

A person of ordinary skill in the art may realize that the units and algorithm steps of the examples described in combination with the embodiments disclosed herein can be implemented by electronic hardware, or a combination of computer software and electronic hardware. Whether these functions are executed by hardware or software depends on specific applications and design constraints for the technical solution. Those skilled persons can use different methods to implement the described functions for each specific application, but such implementations should not be considered to be beyond the scope of the present application.

Those skilled in the art can clearly understand that, for convenience and concise description, the corresponding processes in the foregoing method embodiments may be referred to for the specific working processes of the above-described system, apparatus, and unit, and details are not repeated here.

It should be understood that the system, apparatus, and method disclosed in the several embodiments provided in the present application may be implemented in other ways. For example, the apparatus embodiments described above are merely illustrative. For example, the division of the units is only a logical function division, and there may be other divisions in actual implementation. For example, multiple units or components may be combined or may be integrated into another system, or some features can be ignored or not implemented. In addition, the displayed or discussed mutual coupling or direct coupling or communication connection may be indirect coupling or communication connection through some interfaces, apparatuses or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present application may be integrated into one processing unit, or each unit may exist alone physically, or two or more units may be integrated into one unit.

If the functions are implemented in the form of software functional units and sold or used as an independent product, they can be stored in a computer readable storage medium. Based on such understanding, the essence, or the part that contributes to the prior art, or part of the technical solutions of the present application can be embodied in the form of a software product. The computer software product is stored in a storage medium, including several instructions used to cause a computer device (which may be a personal computer, a server, or a network device, etc.) to execute all or part of the steps of the methods described in the various embodiments of the present application. The aforementioned storage medium includes: a U disk, a mobile hard disk, a read-only memory (Read-Only Memory, ROM), a random access memory (Random Access Memory, RAM), a magnetic disk, an optical disk, or other media that can store program codes.

The above description is only specific implementations of the present application, but the protection scope of the present application is not limited thereto. Any person skilled in the art can easily think of changes or substitutions within the technical scope disclosed in the present application, which should be covered within the protection scope of the present application. Therefore, the protection scope of the present application shall be subject to the protection scope of the claims.

What is claimed is:
1. A wireless communication method, comprising:
receiving, by a terminal device, first information, wherein the first information comprises resource allocations on a plurality of target cells, and the plurality of target cells are located on a first path to be passed through by the terminal device;

wherein the first information is a handover command, and the method further comprises:

determining, by the terminal device, whether the resource allocations on the plurality of target cells are available; and accessing, by the terminal device, target cells at which the resource allocations are located or obtaining synchronization with the target cells at which the resource allocations are located when the resource allocations are available;

wherein the determining, by the terminal device, whether the resource allocations on the plurality of target cells are available comprises:

determining, by the terminal device, whether a measurement value of a third target cell is greater than a first threshold, the third target cell belonging to the plurality of target cells;

determining, by the terminal device, the resource allocation on the third target cell is available when the measurement value of the third target cell is greater than the first threshold; and determining, by the terminal device, the resource allocation on the third target cell is unavailable when the measurement value of the third target cell is less than or equal to the first threshold; and wherein each target cell in the plurality of target cells corresponds to one the first threshold, or, the plurality of target cells correspond to one the first threshold.

2. The method according to claim 1, wherein at least one target cell in the plurality of target cells exists at a same position of the first path, and reservation time of resource allocations on different target cells in the at least one target cell is same or different.

3. The method according to claim 1, wherein reservation time of resource allocations on target cells at adjacent two positions of the first path is different.

4. The method according to claim 1, wherein reservation time of resource allocations on the plurality of target cells is determined according to at least one of location information of the terminal device, a movement speed of the terminal device and a coverage of each target cell in the plurality of target cells.

5. The method according to claim 1, wherein reservation time of resource allocation on each target cell in the plurality of target cells is determined according to a sequence in which the terminal device arrives at the plurality of target cells, and a reservation time start position of resource allocation on a first target cell is the same as a reservation time start position of resource allocation on a second target cell, and reservation time of the resource allocation on the second target cell is greater than reservation time of the resource allocation on the first target cell, wherein the first target cell and the second target cell are located at two adjacent positions on the first path, and a position on the first path at which the second target cell is located is behind the first target cell, the first target cell and the second target cell belong to the plurality of target cells.

6. The method according to claim 1, wherein a reservation time start position of resource allocation on each target cell in the plurality of target cells is determined according to a sequence in which the terminal device arrives at the plurality of target cells, and reservation time of resource allocation on a first target cell is the same as or different from reservation time of resource allocation on a second target cell, and a reservation time start position of the resource allocation on the first target cell is before a reservation time start position of the resource allocation on the second target cell, wherein the first target cell and the second target cell are located at two adjacent positions on the first path, and a position on the first path at which the second target cell is located is behind the first target cell, the first target cell and the second target cell belong to the plurality of target cells.

7. The method according to claim 6, wherein there is an overlapping area between the reservation time of the resource allocation on the first target cell and the reservation time of the resource allocation on the second target cell, or a reservation time end position of the resource allocation on the first target cell is the reservation time start position of the resource allocation on the second target cell.

8. The method according to claim 1, wherein the measurement value comprises one of the followings: a reference signal receiving power (RSRP), a reference signal receiving quality (RSRQ), and a signal to interference plus noise ratio (SINR); and the first threshold is preconfigured or configured by a network device.

9. The method according to claim 1, wherein the first information is used to configure a plurality of target time, the target time corresponds to the target cells one by one, the determining, by the terminal device, whether the resource allocations on the plurality of target cells are available comprises:

in a first target time, determining, by the terminal device, that resource allocation on a target cell corresponding to the first target time is available, and determining that resource allocations on other target cells in the plurality of target cells except the target cell corresponding to the first target time are unavailable; and the target time is absolute time or relative time, or the target time is a period of time.

10. The method according to claim 1, wherein the first information is further used to configure a plurality of target positions, and the target positions correspond to the target cells one by one, the determining, by the terminal device, whether the resource allocations on the plurality of target cells are available comprises: at a first target position, determining, by the terminal device, that resource allocation on a target cell corresponding to the first target position is available, and determining that resource allocations on other target cells in the plurality of target cells except the target cell corresponding to the first target position are unavailable; and the target position is at least one of coordinate and longitude and latitude.

11. The method according to claim 1, wherein the first path is preconfigured, and the method is applied to a non-terrestrial network (NTN).

12. A wireless communication method, comprising:

sending, by a network device, first information to a terminal device, wherein the first information comprises resource allocations on a plurality of target cells, and the plurality of target cells are located on a first path to be passed through by the terminal device;

wherein the first information is a handover command, and wherein whether a measurement value of a third target cell is greater than a first threshold is determined by the terminal device, the third target cell belonging to the plurality of target cells;

wherein the resource allocation on the third target cell is available when the measurement value of the third target cell is greater than the first threshold, whereby the terminal device accesses target cells at which the resource allocations are located or obtains synchronization with the target cells at which the resource allocations are located when the resource allocations are available; and the resource allocation on the third target cell is unavailable when the measurement value of the third target cell is less than or equal to the first threshold; and wherein each target cell in the plurality of target cells corresponds to one the first threshold, or, the plurality of target cells correspond to one the first threshold.

13. The method according to claim 12, further comprising:

determining, by the network device, according to at least one of location information of the terminal device, a movement speed of the terminal device and a coverage of each target cell in the plurality of target cells, reservation time of resource allocations on the plurality of target cells; and determining, by the network device, according to a sequence in which the terminal device arrives at the plurality of target cells, reservation time of resource allocation on each target cell in the plurality of target cells;

wherein a reservation time start position of resource allocation on a first target cell is the same as a reservation time start position of resource allocation on a second target cell, and reservation time of the resource allocation on the second target cell is greater than reservation time of the resource allocation on the first target cell, wherein the first target cell and the second target cell are located at two adjacent positions on the first path, and a position on the first path at which the second target cell is located is behind the first target cell, the first target cell and the second target cell belong to the plurality of target cells.

14. The method according to claim 12, further comprising:

determining, by the network device, according to a sequence in which the terminal device arrives at the plurality of target cells, a reservation time start position of resource allocation on each target cell in the plurality of target cells;

wherein reservation time of resource allocation on a first target cell is the same as or different from reservation time of resource allocation on a second target cell, and a reservation time start position of resource allocation on the first target cell is before a reservation time start position of resource allocation on the second target cell, wherein the first target cell and the second target cell are located at two adjacent positions on the first path, and a position on the first path at which the second target cell is located is behind the first target cell, the first target cell and the second target cell belong to the plurality of target cells.

15. The method according to claim 14, wherein there is an overlapping area between the reservation time of resource allocation on the first target cell and the reservation time of resource allocation on the second target cell; or a reservation time end position of the resource allocation on the first target cell is the reservation time start position of the resource allocation on the second target cell.

16. A terminal device, comprising: a processor, a memory and a transceiver, wherein the memory is configured to store a computer program, and the processor is configured to call and run the computer program stored in the memory and control the transceiver to receive first information, wherein the first information comprises resource allocations on a plurality of target cells, and the plurality of target cells are located on a first path to be passed through by the terminal device;

wherein the first information is a handover command;

wherein the processor is specifically configured to:

determine whether the resource allocations on the plurality of target cells are available; and access target cells at which the resource allocations are located or obtain synchronization with the target cells at which the resource allocations are located when the resource allocations are available;

wherein the processor is specifically configured to:

determine whether a measurement value of a third target cell is greater than a first threshold, the third target cell belonging to the plurality of target cells;

determine the resource allocation on the third target cell is available when the measurement value of the third target cell is greater than the first threshold; and determine the resource allocation on the third target cell is unavailable when the measurement value of the third target cell is less than or equal to the first threshold; and wherein each target cell in the plurality of target cells corresponds to one the first threshold, or, the plurality of target cells correspond to one the first threshold.

17. A network device, comprising: a processor, a memory and a transceiver, wherein the memory is configured to store a computer program, and the processor is configured to call and run the computer program stored in the memory and control the transceiver to execute the method according to claim 12.

18. A computer-readable storage medium, configured to store a computer program, the computer program causing a computer to execute the method according to claim 1.

* * * * *